United States Patent [19]

Ishii et al.

[11] Patent Number: 4,742,369
[45] Date of Patent: May 3, 1988

[54] ELECTRONIC STILL CAMERA

[75] Inventors: Hiroshi Ishii; Tatsuyuki Seki; Eiji Nakazawa, all of Tokyo, Japan

[73] Assignee: Casio Computer Co., Ltd., Tokyo, Japan

[21] Appl. No.: 80,162

[22] Filed: Jul. 28, 1987

Related U.S. Application Data

[63] Continuation of Ser. No. 839,356, Mar. 13, 1986, abandoned.

[30] Foreign Application Priority Data

Mar. 20, 1985 [JP] Japan .................................. 60-56973
Apr. 30, 1985 [JP] Japan .................................. 60-92448
May 7, 1985 [JP] Japan .................................. 60-96234

[51] Int. Cl.⁴ ...................... G03B 7/095; G03B 17/00; H04N 5/76
[52] U.S. Cl. ...................... 354/441; 354/76; 354/106; 354/289.1; 358/226; 358/228; 358/906; 358/909
[58] Field of Search ............... 354/410, 105, 432, 106, 354/219, 75, 76, 210, 435–455, 289.1, 289.12; 358/209, 225, 226, 228, 214, 906, 909

[56] References Cited

U.S. PATENT DOCUMENTS

| | | | |
|---|---|---|---|
| 2,575,536 | 11/1951 | Thompson | 354/210 |
| 3,439,598 | 4/1969 | Weitzner et al. | 354/76 |
| 3,691,312 | 9/1972 | Petersen | 354/75 |
| 4,270,852 | 6/1981 | Suzuki et al. | 354/75 X |
| 4,270,854 | 6/1981 | Stemme et al. | 354/76 |
| 4,301,478 | 11/1981 | Sakane et al. | 358/225 X |
| 4,303,322 | 12/1981 | Someya | 354/219 X |
| 4,322,142 | 3/1982 | Kawamura et al. | 354/402 |
| 4,420,773 | 12/1983 | Toyoda et al. | 358/906 X |
| 4,456,931 | 6/1984 | Toyoda et al. | 358/906 X |
| 4,489,351 | 12/1984 | D'Arc | 358/209 X |
| 4,535,363 | 8/1985 | Harada et al. | 358/225 X |
| 4,553,175 | 12/1985 | Baumeister | 358/906 X |
| 4,574,319 | 3/1986 | Konishi | 358/209 X |
| 4,618,239 | 10/1986 | Sakamoto | 354/76 X |

FOREIGN PATENT DOCUMENTS

| | | | |
|---|---|---|---|
| 369556 | 1/1983 | Austria . | |
| 843810 | 7/1984 | Fed. Rep. of Germany | 354/210 |
| 80038 | 7/1981 | Japan | 354/75 |
| 628444 | 2/1982 | Switzerland . | |
| 2009951 | 6/1979 | United Kingdom . | |
| 2112603 | 7/1983 | United Kingdom . | |

Primary Examiner—W. B. Perkey
Attorney, Agent, or Firm—Frishauf, Holtz, Goodman & Woodward

[57] ABSTRACT

In an electronic still camera, a solid-state imaging element and a photosensitive film which receive an object image and arranged on the optical path of an optical lens system. The object image is simultaneously formed on the solid-state imaging element and the photosensitive film upon depression of a shutter switch.

14 Claims, 16 Drawing Sheets

FIG. 19

| | | | | | | |
|---|---|---|---|---|---|---|
| o | o | o | o | o | o | o |
| o | — | — | o | — | — | o |
| — | o | o | o | o | o | — |
| — | o | o | — | o | o | — |
| — | o | o | — | o | o | — |
| o | — | — | o | — | — | o |
| o | o | o | o | o | o | o |
| o | o | o | o | o | o | o |
| o | — | — | — | — | — | o |
| — | o | o | — | o | o | — |
| — | o | o | — | o | o | — |
| — | o | o | — | o | o | — |
| o | — | — | o | o | — | o |
| o | o | o | o | o | o | o |
| — | — | — | — | — | — | — |
| o | o | o | o | o | o | o |
| o | o | o | o | o | o | o |
| o | o | o | o | o | o | o |
| o | o | o | o | o | o | o |

III-3

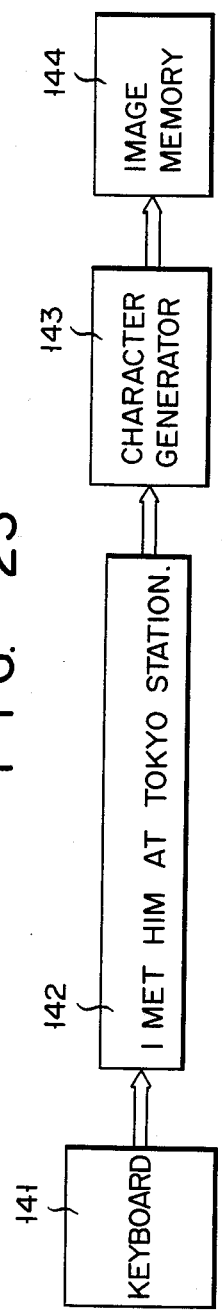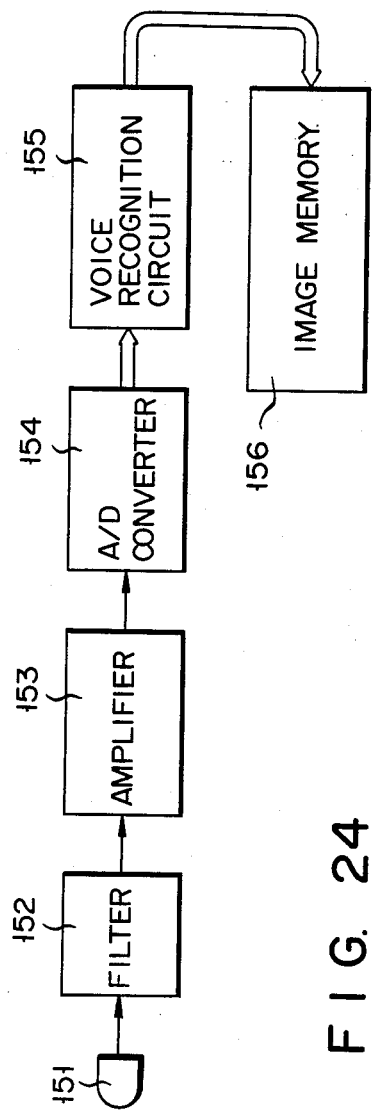
FIG. 23
FIG. 24

ELECTRONIC STILL CAMERA

This application is a continuation of application Ser. No. 839,356, filed Mar. 13, 1986, now abandoned.

BACKGROUND OF THE INVENTION

The present invention relates to an electronic still camera which can confirm an image to be formed using a solid-state imaging element before it is formed on a photosensitive film, and then form the image on the film upon operation of a shutter switch.

In recent years, electronic cameras using an image sensor (e.g., a solid-state imaging element) instead of a silver halide (silver chloride) film have been developed, as disclosed in U.S. Pat. No. 4,535,363 or U.K. Patent No. 2,112,603A.

In an electronic still camera of this type, a MOS or CCD (Charge Coupled Device) image sensor is used. Thus, an electronic still camera with 400,000 pixels per frame is commercially available. Although this is suitable for a video camera, where image is watched on a TV screen, if such an image is produced as a hard copy or printed, a clear photograph, like that obtained with a silver-chloride film camera, cannot be obtained.

More specifically, even if the total number of pixels in an image sensor increases up to several tens of times upon innovations in semiconductor design and manufacturing techniques, it cannot reach the 200 to 240 million pixels (silver-halide particles) in the silver-chloride film camera, thus creating a serious problem.

In contrast to this, although the silver-halide film camera can obtain an image of good quality, it must be handled very carefully to maintain the photosensitivity of the silver-chloride film. Since silver-chloride films are expendable, this increases cost. In addition, after an imaging operation, development and printing are needed to confirm an imaged content. Therefore, if erroneously photographed contents are printed, this creates further increase in cost. Even so, a photographed image cannot be confirmed unless the film is developed. For example, when an imaging operation must be successful, an identical object must be imaged a number of times while changing shutter conditions (e.g., aperture, shutter speed, and the like).

SUMMARY OF THE INVENTION

The present invention has been made in consideration of the above situation and has as its object to provide an electronic still camera which can easily confirm an image without developing or printing a film.

In order to achive the above object, there is provided an electronic still camera comprising:

optical lens system means including a lens and a diaphragm;

solid-state imaging element means on which an object image incident through said optical lens system means is focused;

image signal storage means having a plurality of memory areas, and, coupled to said solid-state imaging element means, for storing in each of said memory areas an image signal the object corresponding to image focused on said solid-state imaging element means;

means for receiving photosensitive film means arranged at a position different from said solid-state imaging element means and on which the object image incident through said optical lens system means is focused;

shutter means arranged in front of said photosensitive film means, and normally closed for preventing the object image incident through said optical lens system means from reaching said photosensitive film means;

switch means;

control means coupled to said switch means, said control means including means for outputting first, second and third control signals when said switch means is operated;

storage control means for controlling the storing of a still image signal, said storage control means including means responsive to said first control signal for causing said image signal storage means to sequentially store in different memory areas still image signals which correspond to respective object images which are incident through said optical lens system means and which are focused on said solid-state imaging element means;

shutter drive means responsive to said second control signal for opening said shutter means so that a still image of the object image, which is incident through said optical lens system means, is formed on photosensitive film means in said receiving means; and optical system control means responsive to said third control signal controlling the amounts of light representing an object image which pass through said diaphragm of said optical lens system means during the operation of said storage control means and during the operation of said shutter drive means, so that the amount of light representing the object image at the position of said solid-state imaging element means during operation of said storage control means, is substantially equal to the amount of light representing the object image at the position of said receiving means during operation of said shutter drive means.

With this arrangement, an electronic still camera of the present invention forms an image on a photosensitive film or a solid-state imaging element upon operation of a shutter switch. Therefore, if an image formed on the solid-state imaging element is reproduced, film contents can be confirmed without developing or printing the film. Therefore, even during an imaging operation, an imaged content can be checked. Since only a desired image can then be printed, this reduces overall cost. In addition, the film can be stored after taking photographs, and an electronic image can be reproduced from the film if necessary, thus providing a practical advantage when the film is to be developed.

BRIEF DESCRIPTION OF THE DRAWINGS

FIG. 19 is an illustration of a storage content of a memory in FIG. 18;

FIG. 23 is a schematic block diagram for explaining still another embodiment wherein data added to a displayed object image is input by a key operation of a keyboard; and FIG. 24 is a schematic block diagram of still another embodiment wherein a voice as the data in FIG. 23 is input.

DETAILED DESCRIPTION OF THE PREFERRED EMBODIMENTS

Figure 1:
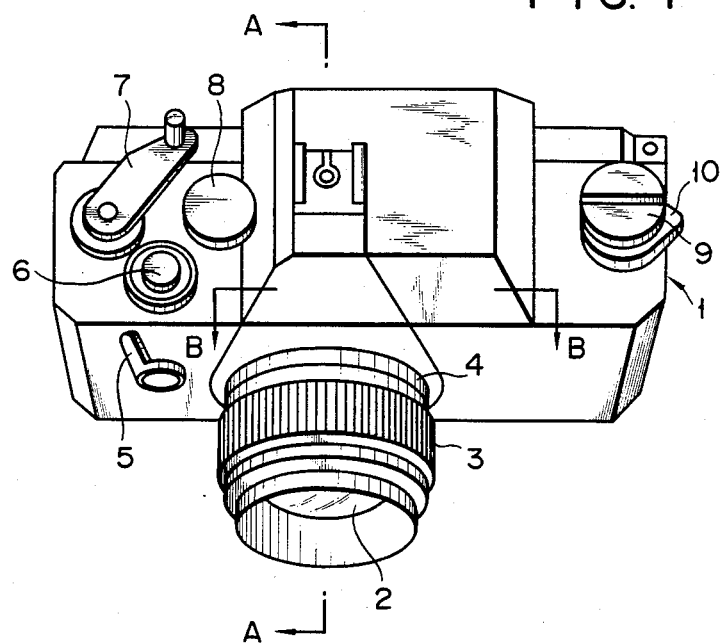
FIG. 1 is a perspective view of a single-lens reflex camera to which the present invention is applied.
Figure 2:
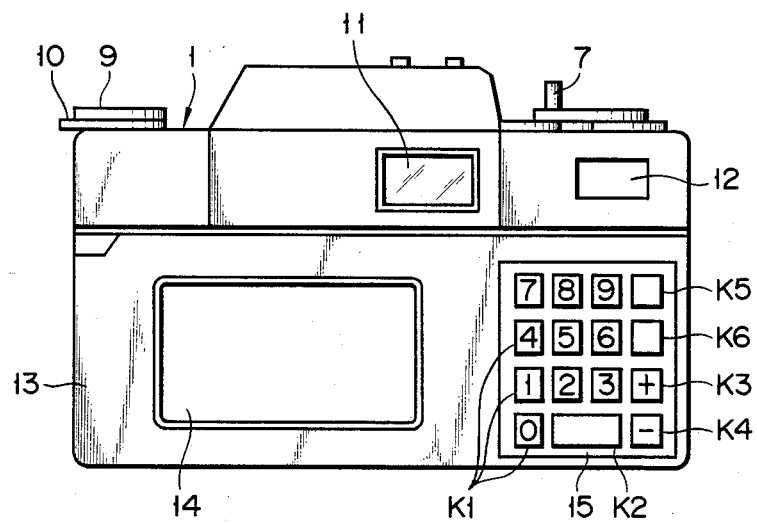
FIG. 2 is a rear view of the camera shown in FIG. 1.

A first embodiment of the present invention will be described in detail with reference to FIGS. 1 to 5. In this embodiment, the present invention is applied to a single-lens reflex camera, and FIG. 1 is a perspective view thereof. Reference numeral 1 denotes a camera main body; 2, an imaging lens; 3, a distance ring; 4, an aperture ring; 5, a self-timer lever; 6, a shutter switch comprising a self-return push-button switch; 7, a wind-up lever; 8, a shutter speed dial; 9, a film rewind nob; and 10, a film-sensitivity dial. These components are the same as those in a normal camera. FIG. 2 shows a rear portion of the camera in FIG. 1, in which reference numeral 11 denotes a finder; 12, a film number window; and 13, a rear cover. In this embodiment, liquid-crystal display device 14 and keyboard 15 are arranged on rear cover 13. Liqid-crystal display device 14 is driven by a 120×160 dot-matrix display method and is used as a reproduction section of the electronic still camera which can display an image of one frame. Keyboard 15 consists of various keys for specifying 36 frames of image data formed on a recording medium of the electronic still camera to display the selected image data on device 14. More specifically, keyboard 15 consists of ten keys K1 for inputting an image number to be displayed, display key K2 for displaying an image corresponding to an input image number, plus key K3 for sequentially displaying the next image, and minus key K4 for displaying the preceding image. In addition to the above keys, keyboard 15 includes display ON key K5 and OFF key K6 for selecting whether or not an image is displayed on device 14.

Figure 3:
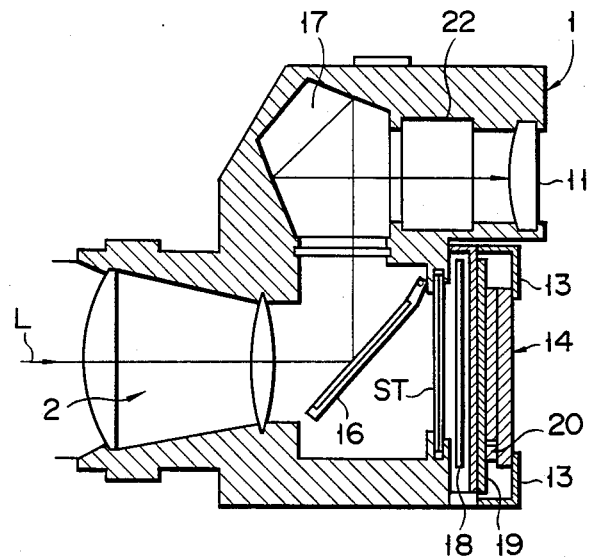
FIG. 3 is a sectional view taken along line A—A in FIG. 1.
Figure 4:
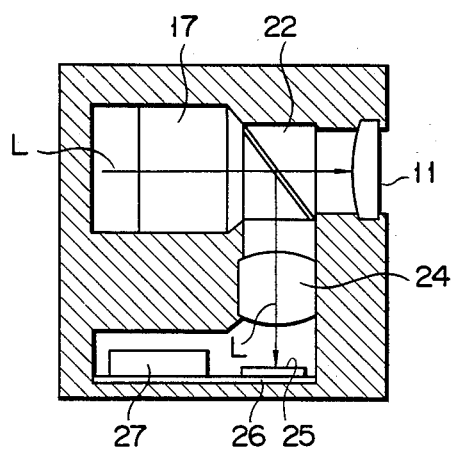
FIG. 4 is a sectional view taken along line B—B in FIG. 1.

FIG. 3 is a sectional view taken along line A—A in FIG. 1. This camera has a single-lens reflex camera structure as follows. Light from an object propagates along optical path L through imaging lens 2, and is reflected by reflection mirror 16, which is inclined at 45°. The reflected light from mirror 16 is guided to finder 11 through pentagonal prism 17. In addition, when mirror 16 is automatically pivoted upward to be interlocked with an opening operation of shutter curtain ST, the light through lens 2 is guided to silver-chloride film 18. Flexible circuit board 19 is formed on an inner surface of rear cover 13, and is electrically connected to device 14 through interconnector 20 and to keyboard 15 shown in FIG. 1. Spectral prism 22 is arranged on an optical path between pentagonal prism 17 and finder 11. Prism 22 receives light, which propagates through a focusing screen and prism 17 toward the center of finder 11, and partially directs it in a direction perpendicular to light incident on finder 11 in an identical plane, thereby guiding the light onto image sensor 25 through focusing lens 24. If an amount of light incident on finder 11 is 80% of the total amount of light, image sensor 25 receives 20% of the light. Therefore, finder 11 is darker than the finder in a normal camera. However, this can be solved by automatically opening a diaphragm, as will be described later.

Image sensor 25 comprises solid-state imaging elements. In this embodiment, CCDs having an infrared cut filter or three-primary color mosaic color filter at the input side are used as imaging elements and are arranged to provide a given total number (e.g., about 400,000) of pixels, thus improving resolution. An object image frame is focused on image sensor 25. Image sensor 25 detects a density distribution of the object image and converts the image focused thereon into an electrical signal. For image sensor 25, known frame transfer type or interline type CCD sensors can be used. Image sensor 25 is arranged on printed circuit board film 26, and semiconductor chip 27 comprising an LSI (Large-Scale Integrated circuit) is also mounted thereon. Sensor 25 and chip 27 are electrically connected through film 26.

Figure 5:
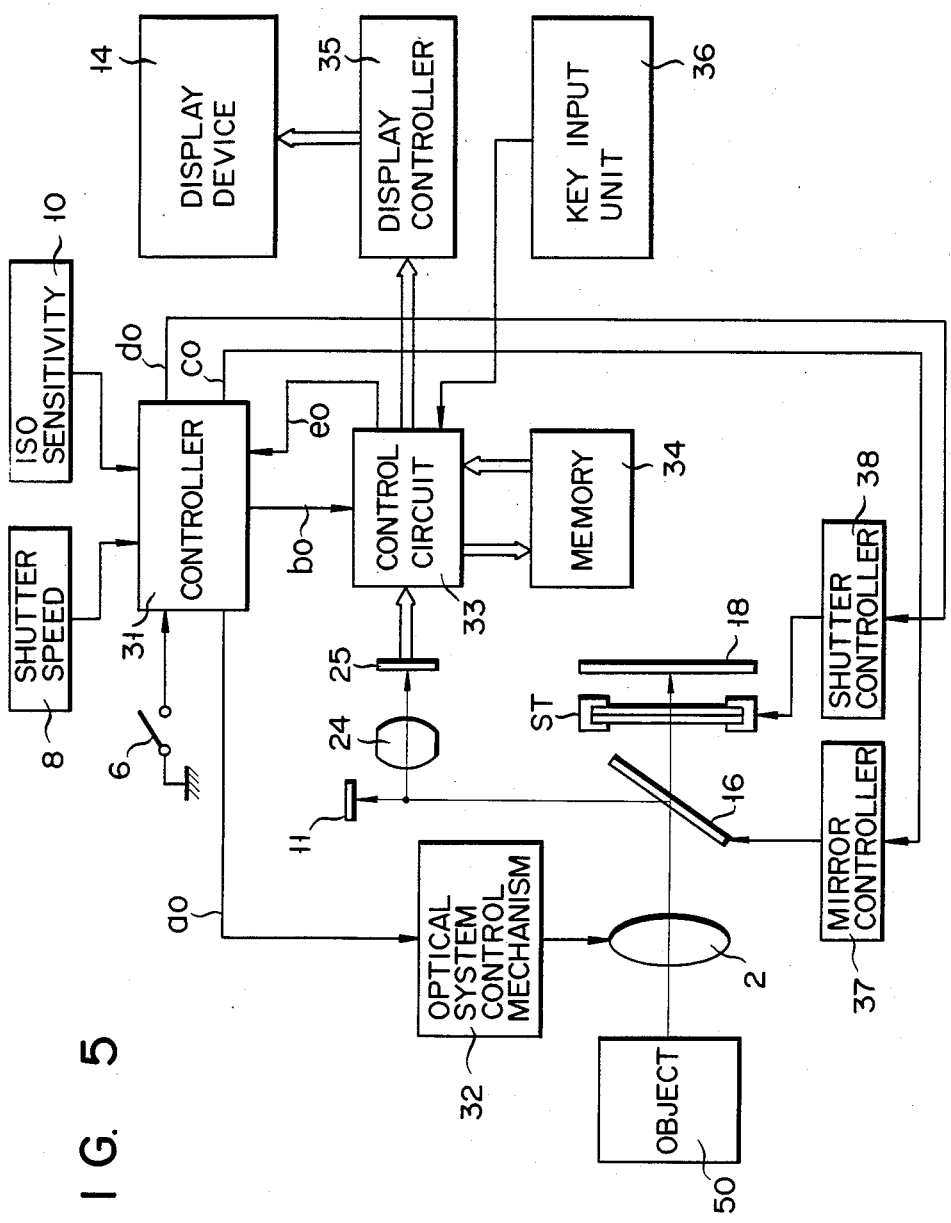
FIG. 5 is a block diagram of the camera shown in FIG. 1.

FIG. 5 is a block diagram of this camera comprising a one-chip microcomputer as its main component. Reference numeral 31 denotes a controller which controls various operations in accordance with a prestored micro-program. Controller 31 receives signals generated upon operation of shutter switch 6, shutter speed dial 8, and film sensitivity dial 10, and produces control signals a0, b0, c0, and d0 accordingly. For controller 31, a controller circuit shown in FIG. 1 of U.K. Patent No. 2,112,603 can be used. Control signal a0 is supplied to optical system control mechanism 32 to drive a diaphragm mechanism to obtain a predetermined aperture For mechanism 32, a shutter driving circuit shown in FIG. 1 of U.K. Patent No. 2,112,603 can be used. Control signal b0 is an elecronic still camera driving signal which is supplied to electronic-camera control circuit 33. In this case, circuit 33 sequentially fetches, as image data of one frame, data corresponding to an object image received by image sensor 25 through lens 2, mirror 16, lens 24, and the like. Circuit 33 then writes the received data in semiconductor memory 34 as an image recording medium, and causes display controller 35 to display an image on display device 14. For circuit 33, a processing circuit shown in FIG. 1 of U.K. Patent No. 2,112,603 can be used. Semiconductor memory 34 comprises a RAM (Random-Access Memory), and can store 36 frames of image data. A read/write operation of memory 34 is performed under the control of circuit 33. Note that circuit 33 receives a key input signal generated from key input section 36 corresponding to key operation of keyboard 15, and controls a display operation of device 14 and the read/write operation of memory 34 accordingly. Control circuit 33 supplies signal e0 to controller 31, thus causing it to generate control signals c0 and d0. Signal c0 is supplied to mirror controller 37 to control pivotal movement of mirror 16. Signal d0 is supplied to shutter controller 38 to control an opening operation of shutter curtain ST.

The operation of this embodiment will now be described. When imaging lens 2 is directed toward object 50, an object image passes through lens 2, is reflected by mirror 16, and is then focused on finder 11. A focal point of the image is adjusted by distance ring 3, and an aperture is adjusted by aperture ring 4. When shutter switch 6 is depressed after the focal point and the aperture are manually adjusted, a depression signal is supplied to controller 31. Controller 31 first generates signal a0 and supplies it to mechanism 32. Mechanism 32 is then operated to automatically open the manually adjusted aperture by a predetermined amount. In this case, light incident on finder 11 is beam-split by spectral prism 22 and is guided to image sensor 25 through lens 24. Therefore, an aperture set to be interlocked with a shutter operation is determined by the beam-splitting amount of spectral prism 22 and a sensitivity of image sensor 25 so that finder 11 will not be darkened and light is sufficiently radiated on image sensor 25. When the diaphragm is opened by the predetermined amount, signal b0 is supplied from controller 31 to circuit 33. In this case, since light beam-split by prism 22 is guided to image sensor 25 through focusing lens 24, circuit 33 sequentially fetches image data of one frame corresponding to the object image sensed by sensor 25 and supplies it to memory 34 and controller 35. Thus, image data of one frame fetched from sensor 25 is written in memory 34, and is converted into a display driving signal by controller 35 to be displayed on device 14. In this way, when the image data of one frame is fetched, circuit 33 supplies signal e0 to controller 31. In response to this, mechanism 32 is operated by output as from the controller 31 to return the diaphragm to the original state before the shutter switch was depressed. Signal c0 is then supplied from controller 31 to mirror controller 37 to pivot mirror 16. Subsequently, signal d0 is supplied from controller 31 to shutter controller 38 to open shutter curtain ST. For this reason, the object image from lens 2 is formed on silver-chloride film 18 upon opening of curtain ST.

Thus, when shutter switch 6 is depressed for the imaging operation, the object image is sensed by sensor 25 and written in memory 34, and thereafter is formed on film 18. Each time shutter switch 6 is depressed to repeat the above operation, 24 or 36 frames of image data corresponding to the film frame number are sequentially stored in memory 34 in the sensed order.

Since an imaged content is displayed on device 14 upon taking each photograph, an operator can confirm before developing whether or not a sensed object image is successful. If he decides the sensed image is unsuccessful, he can take another photograph of the same object. If the operator wants to confirm the sensed contents before or after a 36-frame imaging operation is completed, he inputs an image number (e.g., if he wants to confirm the 10th image, he inputs image number "10") using ten keys K1 on keyboard 15, and then depresses display key K2. Thus, the corresponding address in memory 34 is specified, and the 10th image data is read out to be displayed on device 14. At this time, if he also wants to confirm the 11th image, he need only depress plus key K3 once to read out the 11th image data from memory 34 and have it displayed on device 14. When he depresses key K3 once more, the 12th image data is read out from memory 34 and is displayed on device 14. Thus, each time plus key K3 is depressed, the succeeding images can be sequentially displayed on device 14. On the other hand, if he depresses minus key K4 while the 10th image data is displayed, the 9th image data is read out from memory 34 and displayed on device 14. If depressed once more, the 8th image data is read out to be displayed on device 34. In this way, each time minus key K4 is depressed, the preceding image data can be sequentially displayed. Since images on the film can be confirmed before printing, unsuccessful or unnecessary frames need not be printed, thereby reducing overall cost.

Figure 6:
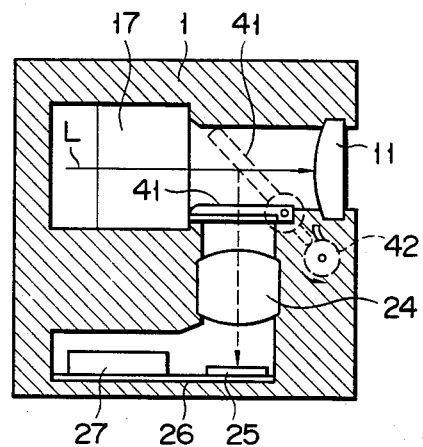
FIG. 6 is a sectional view of another embodiment of the present invention taken along line B—B in FIG. 1.

A second embodiment of the present invention will now be described with reference to FIGS. 6 and 7. In the first embodiment, the spectral prism is arranged between the pentagonal prism and the finder. In the second embodiment, however, movable mirror 41 is arranged between a pentagonal prism and finder 11, as shown in FIG. 6, so that light reflected by mirror 41 is guided onto image sensor 25 through focusing lens 24. Movable mirror 41 is driven by its special driving mechanism, and is inclined at 45° (a broken-line position in FIG. 6) from a horizontal position (a solid-line position in FIG. 6) with respect to incident optical path L.

Figure 7:
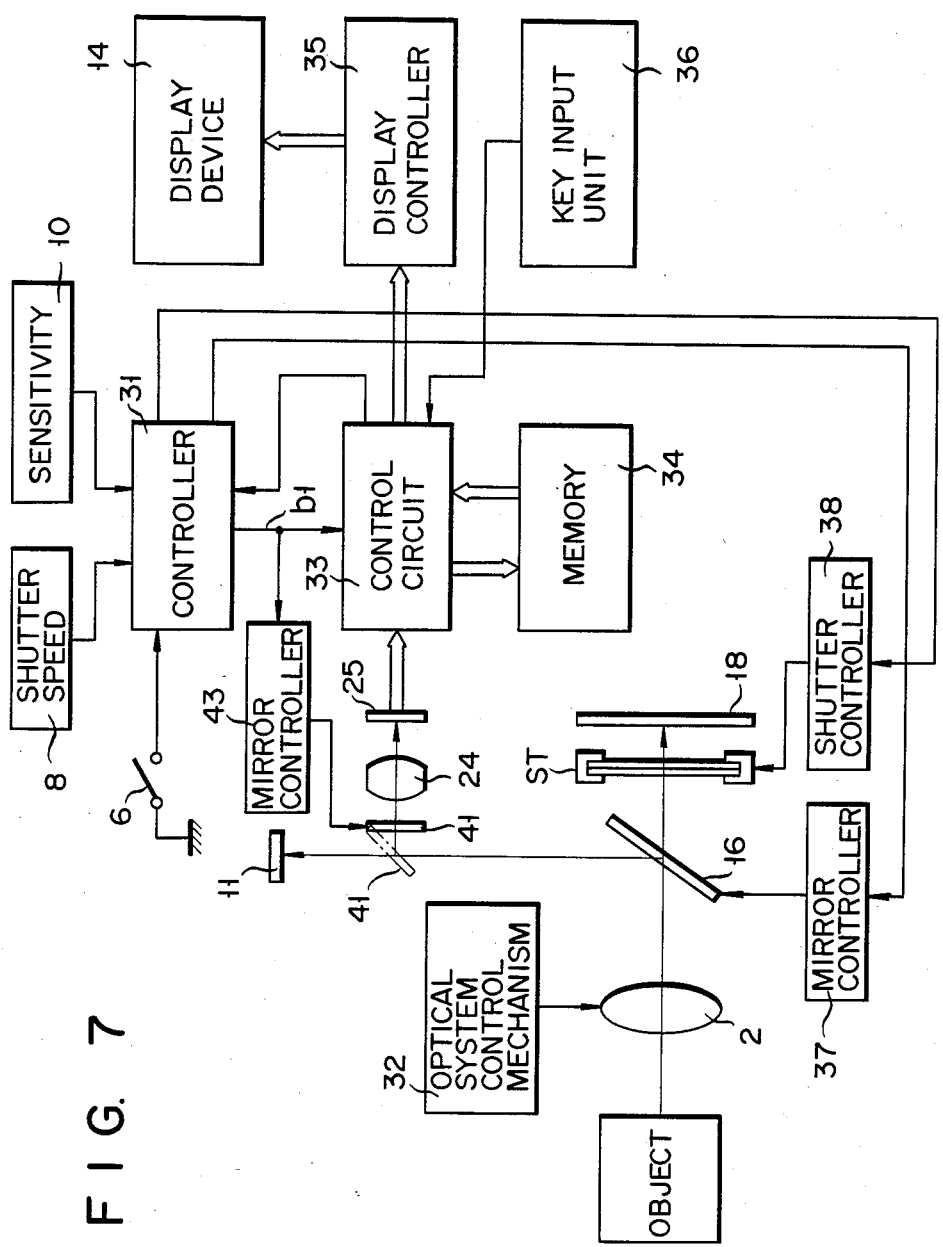
FIG. 7 is a block diagram of the embodiment in FIG. 6.

FIG. 7 shows a circuit arrangement of the camera in FIG. 6, and the same reference numerals in FIG. 7 denote the same parts as in FIG. 5 and detailed description thereof will be omitted. In the second embodiment, signal b1 generated from controller 31 upon depression of shutter switch 6, in addition to being input to control circuit 33, is input to mirror controller 43 for driving mirror 41. Controller 43 drives mirror 41 in accordance with signal b1 so as to set mirror 41 at the broken-line or solid-line position in FIG. 6. Note that signal b1 input to circuit 33 has the same function as that of signal b0 in the first embodiment.

Before shutter switch 6 is depressed, mirror 41 is set at the solid-line position in FIG. 6. Therefore, light from the pentagonal prism is incident directly on finder 11. When shutter switch 6 is depressed in this state, signal b1 is first generated from controller 31, and is input to controller 43 and circuit 33. In response to this, mirror 41 is pivoted between the pentagonal prism and finder 11, and is set at a position inclined at 45° with respect to optical path L (i.e., the broken-line position in FIG. 6). Thus, at the same time switch 6 is depressed, all the light from the pentagonal prism is deflected by mirror 41 through 90° and is then incident on image sensor 25 through focal-point prism 24. On the other hand, upon reception of signal b1, circuit 33 fetches image data from image sensor 25 to store it in semiconductor memory 34 and to display it on liquid-crystal display device 14, in the same manner as in the first embodiment.

In the second embodiment, since movable mirror 41 interlocked with switch 6 is arranged between the pentagonal prism and finder 11, light from the pentagonal prism is incident directly on finder 11 before switch 6 is depressed, and is reflected by mirror 41 to be incident on image sensor 25 without being guided to finder 11 after switch 6 is depressed. As a result, in this embodiment, after switch 6 is depressed, the diaphragm need not be opened by a given amount or returned to an original state, unlike the first embodiment. The other arrangements are the same as those in the first embodiment, and the same effect as in the first embodiment can be obtained.

A third embodiment of the present invention will be described with reference to FIG. 8. The third embodiment is a modification of the second embodiment, in which shutter switch 51 comprises a two-stroke switch. More specifically, shutter switch 51 has a two-depression structure consisting of push button 52, coil spring 53 installed in button 52, switch segment 54 fixed to a lower end portion of button 52, operation shaft 55 inserted in button 52 to extend through segment 54 and abutting against coil spring 53, and switch segment 56 fixed to a lower end portion of shaft 55. Switch segment 56 and switch contact 57 constitute switch S1, and switch segment 54 and switch contact 58 constitute switch S2. Switches S1 and S2 supply signals a and b to controller 31 when their segments are respectively brought into contact with their contacts. In this case, when controller 31 receives signal a, it supplies signals a1 to control circuit 33 and mirror controller 43, and when it receives signal b, it supplies signals bx and by to corresponding AND gates 59 and 60. AND gates 59 and 60 also receive signal e0 from control circuit 33. The output from AND gate 59 is supplied to shutter controller 38 and that from AND gate 60 is supplied to mirror controller 37, as respective operation signals. The other arrangements are the same as those of the second embodiment shown in FIG. 7.

Figure 8:
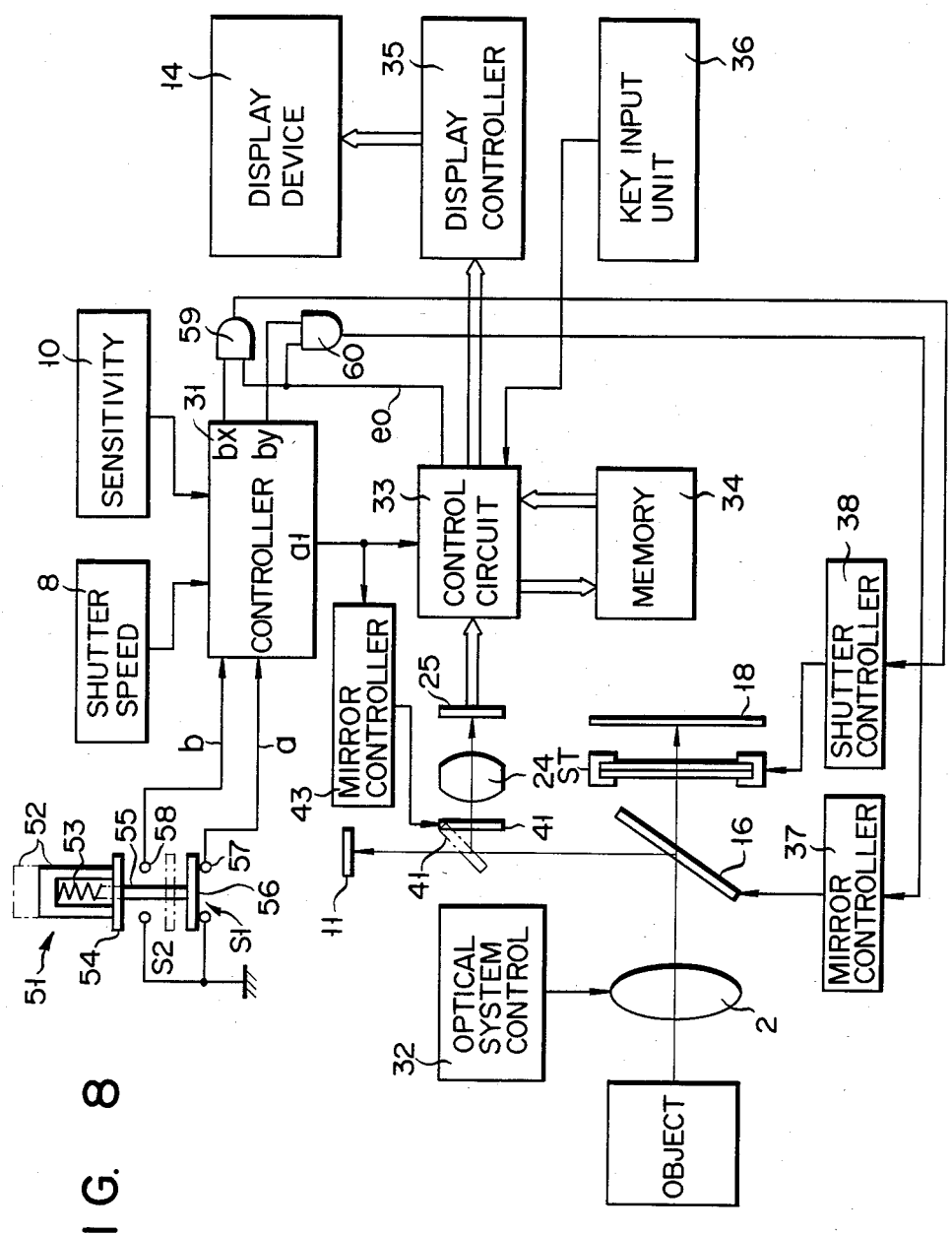
FIG. 8 is a block diagram of still another embodiment of the present invention.

Shutter switch 51 is normally set at a broken-line position in FIG. 8. In this state, wherein both switches S1 and S2 are OFF, when switch 51 is depressed by one stroke, only lower switch S1 is ON and signal a is supplied to controller 31. Thus, controller 31 produces signal a1 to set mirror 41 at the broken-line position, and image data is fetched from image sensor 25 to be stored in semiconductor memory 34. When switch 51 is further depressed in this state, upper switch S2 is ON while switch S1 is kept ON, and signal b is supplied to controller 31. In response to this, since controller 31 supplies signals bx and by to controllers 38 and 37 through corresponding AND gates 59 and 60, mirror 16 is pushed up and shutter curtain ST is opened. If an operator releases his finger from switch 51, switch 51 automatically returns to the broken-line position. Therefore, imaging operations for image sensor 25 and silver-chloride film 18 can be time-serially performed upon depression of shutter switch 51. Thus, after an imaged content displayed on device 14 is confirmed by depressing switch S1, the content can be formed on film 18 by depressing switch S2. In addition, the same effect as in the first and second embodiments can be obtained.

Figure 9:
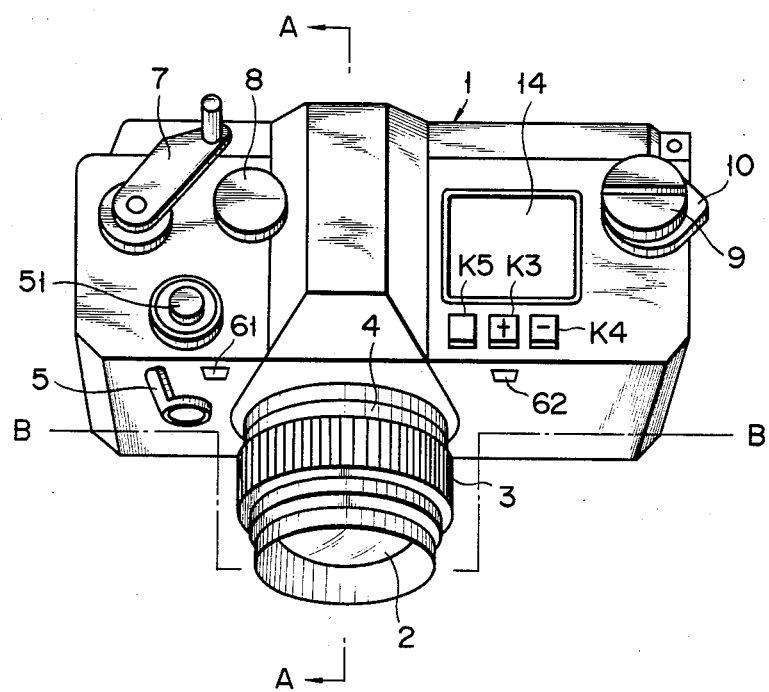
FIG. 9 is a perspective view of a single-lens reflex camera according to still another embodiment of the present invention, different from that in FIG. 1.

A fourth embodiment of the present invention will now be described with reference to FIGS. 9 to 12. In the fourth embodiment, the present invention is applied to a single-lens reflex camera comprising an active type auto-focus function using infrared rays. FIG. 9 is a perspective view of the camera of this embodiment. Auto-focus windows 61 and 62 are formed in a front surface portion of camera main body 1, and an infrared light-emitting diode and an infrared sensor are respectively arranged therebehind. In this embodiment, liquid-crystal display device 14, plus key K3, minus key K4, and ON key K5 are arranged on an upper surface portion of main body 1. Shutter switch 51 has a two-stroke structure shown in FIG. 8.

Figure 10:
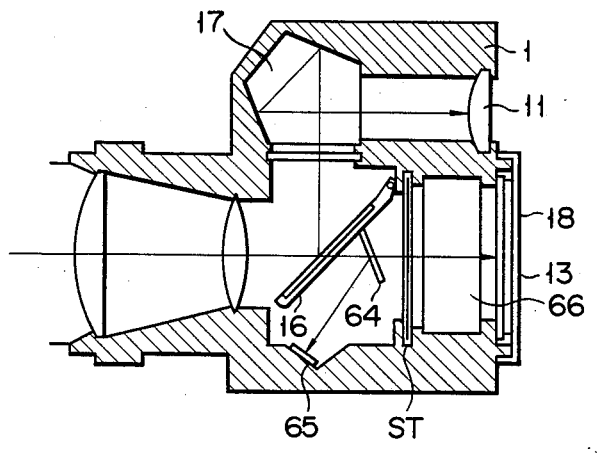
FIG. 10 is a sectional view taken along line A—A in FIG. 9.
Figure 11:
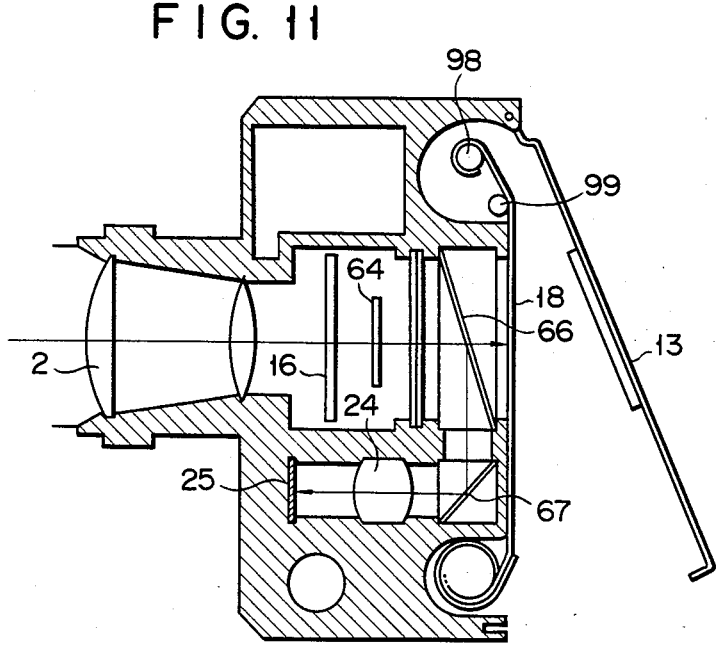
FIG. 11 is a sectional view taken along line B—B in FIG. 9.

FIG. 10 is a sectional view taken along line A—A in FIG. 9. Reference numeral 64 denotes a TTL automatic exposure submirror. Light reflected by submirror 64 is incident on photometric CCD 65. In this embodiment, spectral prism 66 is arranged between shutter curtain ST and silver-chloride film 18. Prism 66 actually has a square cross-section, and guides light, which is incident upon depression of switch 51, onto film 18, as shown in FIG. 11. In addition, prism 66 partially beam-splits light in a direction perpendicular thereto, and guides it to reflection prism 67. Prism 67 reflects light from prism 66 at a right angle to guide it to image sensor 25 through focusing lens 24 in a direction opposite to an incident path to film 18. Reference numeral 98 denotes a film takeup shaft; and 99, a sprocket.

Figure 12:
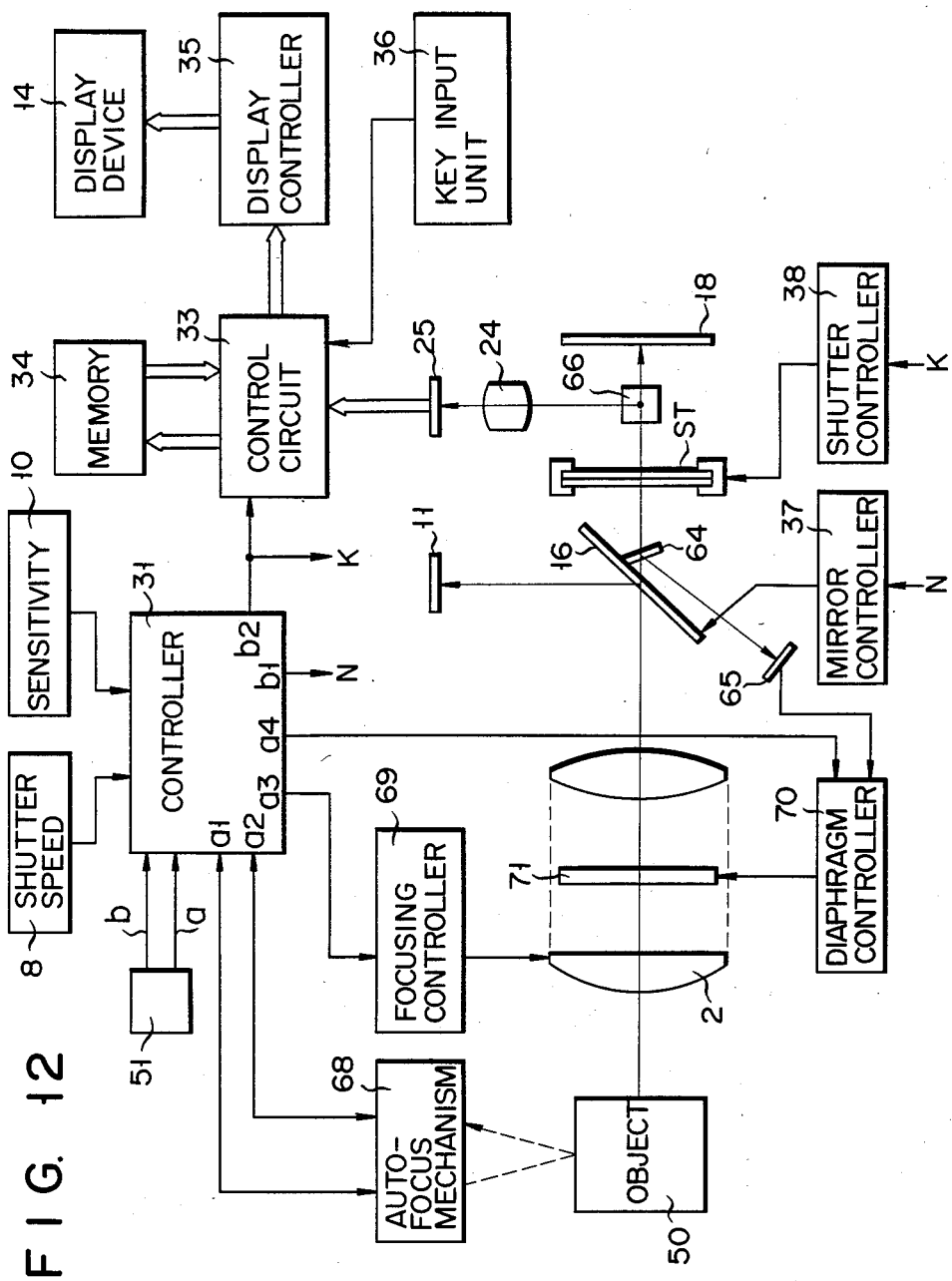
FIG. 12 is a block diagram of the embodiment shown in FIG. 9.

FIG. 12 shows a circuit configuration of this camera. When controller 31 receives signal a from shutter switch 51, it produces signal a1 to auto-focus mechanism 68, and light from an object is input as signal a2 to controller 31 through mechanism 68. In response to this, controller 31 supplies signals a3 and a4 to focusing controller 69 and diaphragm controller 70, respectively. Focusing controller 69 performs focusing control by controlling imaging lens 2 of the optical system, and diaphragm controller 70 controls diaphragm 71. In response to signal b from shutter switch 51, controller 31 supplies signals b1 and b2 to mirror controller 37 and shutter controller 38, respectively. Signal b2 from controller 31 is also supplied to control circuit 33 to execute an image readout operation from image sensor 25. A signal generated from CCD 65 in response to light reflected from submirror 64 is supplied to controller 70.

With the above arrangement, when shutter switch 51 is depressed by one stroke and signal a is supplied to controller 31, auto-focus mechanism 68 is operated to perform automatic focusing control. Controller 70 is operated based on the output from CCD 65 to perform automatic exposure. In this embodiment, as shown in FIG. 11, since incident light is beam-split toward film 18 and image sensor 25, the diaphragm must be opened accordingly. For example, if an amount of light fed from prism 66 to film 18 is 80% the total amount of light, the aperture is opened to increase the amount of light by 25%. When switch 51 is further depressed and signal b is then supplied to controller 31, mirror 16 is lifted up and shutter curtain ST is opened. At the same time switch 51 is further depressed, an object image is formed on both film 18 and image sensor 25. In this embodiment, since an object image is formed on film 18 and sensor 25 at the same time, the same image can be obtained. In addition the same effect as in the first embodiment can also be obtained.

Figure 13:
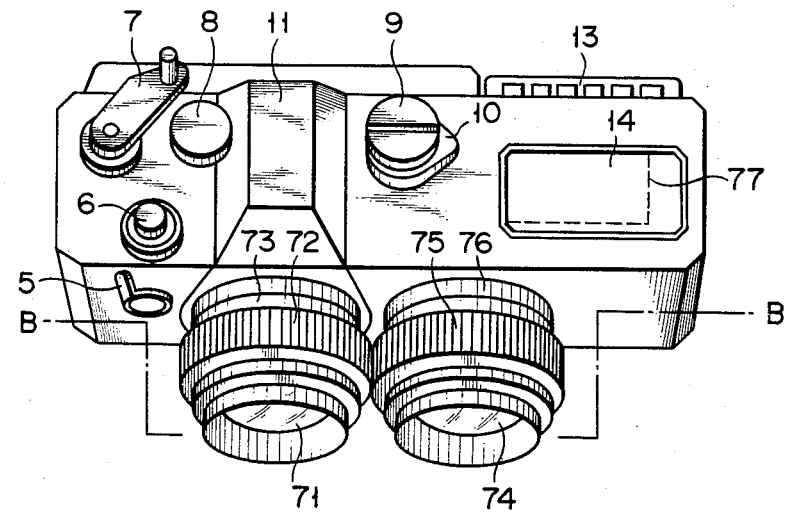
FIG. 13 is a perspective view of still another embodiment of the present invention.

A fifth embodiment of the present invention will now be described with reference to FIGS. 13 and 14. In this embodiment, optical systems for a silver-chloride film camera and for an electronic still camera are provided independently, and FIG. 13 is a perspective view thereof. In FIG. 13, reference numeral 71 denotes an optical system for a silver-chloride film camera; 72, a distance ring; and 73, an aperture ring. Distance ring 72 is controlled by the same mechanism as those of auto-focus mechanism 68 and focusing controller 69 shown in FIG. 12. Aperture ring 73 is controlled by the same mechanism as that of aperture controller 70 shown in FIG. 12. Reference numeral 74 denotes an optical system for an electronic still camera; 75, a distance ring; and 76, an aperture ring. Distance rings 72 and 75 are arranged parallel to each other in a widthwise direction of the camera, and teeth parallel to the axes of rings 72 and 75 are formed on outer circumferential portions thereof. The teeth of rings 72 and 75 are meshed with each other to transmit rotation of ring 72 to ring 75. Finder 11 is arranged on an upper surface portion of main body 1 at a position corresponding to optical system 71 of the silver-chloride camera. Therefore, optical system 74 of the electronic still camera is arranged at a position shifted from finder 11. Liquid-crystal display device 14 is also arranged on the upper surface portion of main body 1, and broken line 77 indicating an imaging range of the silver-chloride film camera is printed on device 14. An imaging range of the electronic still camera includes that of the silver-chloride film camera.

Figure 14:
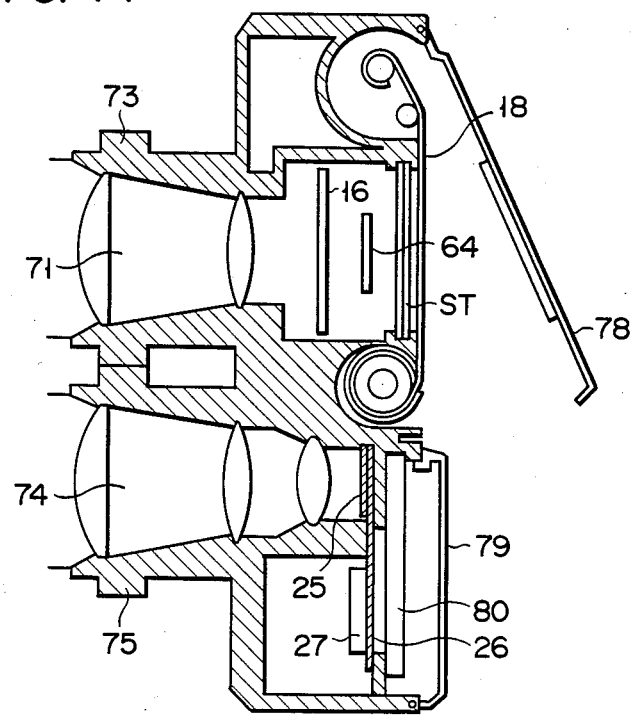
FIG. 14 is a sectional view taken along line B—B in FIG. 13.

FIG. 14 is a sectional view taken along line B—B in FIG. 13. The silver-chloride film camera is a single-lens reflex camera having a TTL automatic exposure function, and has a normal structure comprising reflection mirror 16, submirror 64, shutter curtain ST, silver-chloride film 18, and the like. In the electronic still camera, image sensor 25 is arranged to coincide with the axis of optical system 74, and is electrically connected to semiconductor chip 27 through printed circuit board film 26. In this embodiment, respective rear covers 78 and 79 for the silver-chloride film and electronic still cameras are independently provided, and magnetic disk 80 is detachably arranged in a rear portion of main body 1 at the side of cover 79. Magnetic disk 80 can be inserted in a magnetic disk reproduction device to display image data on a CRT screen.

Note that the fifth embodiment shown in FIGS. 13 and 14 has substantially the same circuit configuration as in FIG. 12. More specifically, in FIG. 12, light beamsplit from sprectral prism 66, which is arranged in front of silver-chloride film 18, is guided onto image sensor 25 through focusing lens 24. However, in the fifth embodiment, an object image is supplied to image sensor 25 through optical system 74 of the electronic still camera. The other arrangements of the fifth embodiment are the same as those in FIG. 12.

With the arrangement of this embodiment, when a focusing operation is performed by rotating distance ring 72 of the silver-chloride film camera by operation of shutter switch 51, ring 75 of the electronic still camera is also rotated therewith, and the focal point of the electronic still camera can be automatically adjusted at the same time. Then, an object image is formed on film 18 and image sensor 25 at the same time. Since optical systems 71 and 74 are independently provided in this embodiment, an optical system corresponding to the desired type of camera can be used, and the same effect as in the first embodiment can be obtained.

Note that in each of the above embodiments, the image sensor as a solid-state imaging element comprises a CCD, but can be a MOS or a CPD (a combination of CCD and MOS) type image sensor. The semiconductor memory and the magnetic disk have been exemplified in the first to fourth embodiments and the fifth embodiment, respectively, as the recording media of the electronic still camera, but a magnetic disk can be used in the first to fourth embodiments and a semiconductor memory in the fifth embodiment. In addition, a magnetic bubble memory can be used as a nonvolatile solid-state memory.

The electronic still camera was a color still camera having a so-called mosaic filter in which three primary-color segments are dispersed in a mosaic form. However, the electronic still camera can be a monochrome still camera.

A sixth embodiment of the present invention will now be described, in which an optical display device for optoelectrically displaying an image focused on a solid-state imaging element is provided.

Figure 15:
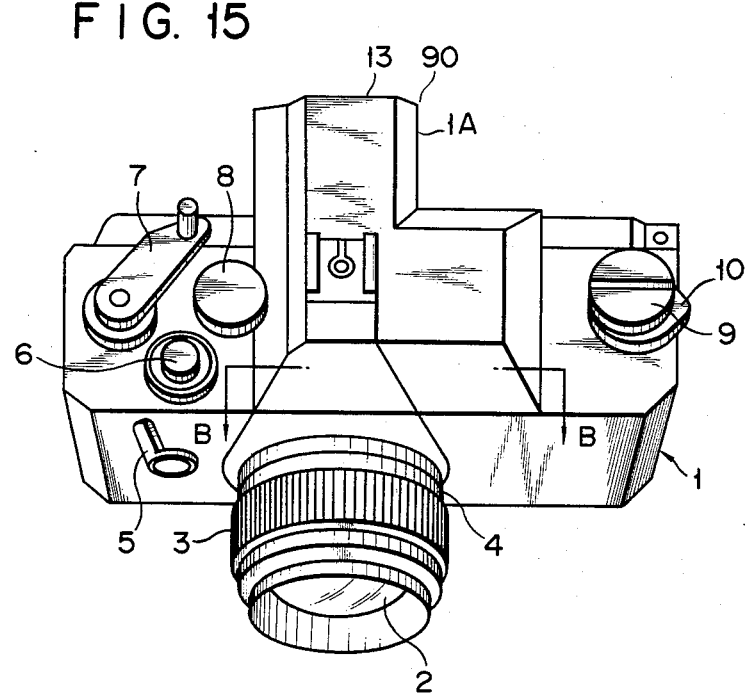
FIG. 15 is a perspective view of an electronic still camera according to still another embodiment of the present invention.

FIG. 15 is a perspective view of an electronic still camera which has substantially the same outer appearance as in the first embodiment, except that optical display device 90 is added. The same reference numerals in FIG. 15 denote the same parts as in FIG. 1, and a detailed description thereof will be omitted.

Figure 16:
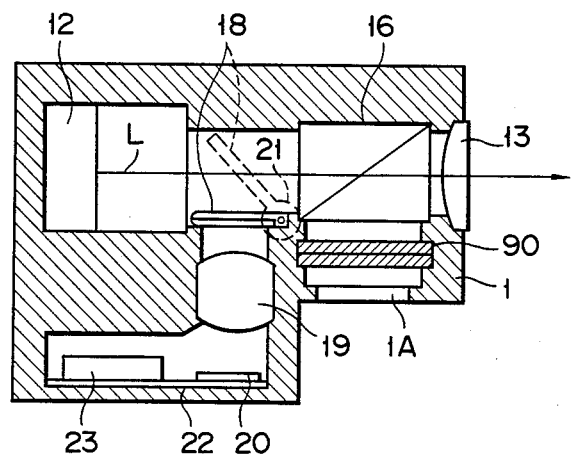
FIG. 16 is a sectional view taken along line B—B in FIG. 15.

FIG. 16 is a sectional view taken along line A—A in FIG. 15 and shows an internal structure of the electronic still camera of this embodiment. Prism 16 is arranged along an optical path between pentagonal prism 12 and finder 13. Prism 16 guides light from display device 90 into finder 13 in a direction perpendicular thereto, so as to be visually observed thereby.

Optical display device 90 comprises a liquid-crystal display device driven by a 120×160 dot-matrix display method, and serves to provide an image reproduction function of the electronic still camera and to display an image frame. Device 90 is also of a light-transmitting type, and is irradiated with natural light guided through opening portion 1A of main body 1. Open/close mirror 18 is arranged along an optical path between pentagonal prism 12 and prism 16. Mirror 18 guides light from prism 12 to image sensor 20 through focusing lens 19. More specifically, mirror 18 is driven by its special driving mechanism 21, so that it is closed at a position (a solid-line position in FIG. 16) parallel to incident optical path L to finder 13 and is opened at a position inclined at 45° therefrom (a broken-line position in FIG. 16).

Shutter switch 6 has the same two-stroke structure as switch 51 shown in FIG. 1. When switch 6 is depressed by one stroke, an image frame is focused on image sensor 20 as a solid-state imaging element. The image data is stored in semiconductor memory 23 on printed circuit board film 22, and is then displayed on device 90. An operator can therefore visually observe and confirm the image data through device 90. If he decides the image is successful, he further depresses switch 6. As a result, mirror 18 is lifted up, a shutter curtain is opened, and an object image is focused on a silver-chloride film. However, after switch 6 is depressed by one stroke, if an operator decides the image is unsuccessful, he releases switch 6 until the next shutter use and the image is not formed on the film.

In this embodiment, before switch 6 is depressed, an object image is formed directly on finder 13. When switch 6 is depressed by one stroke in this state, since the object image is focused on image sensor 20 and displayed on device 90, the image data from image sensor 20 is then displayed on finder 13. An operator further depresses switch 6, after he confirms the image, to form it on the film, thus allowing a failure-free imaging operation. In this case, image-data fetching of image sensor 20 is made under the same conditions as the image forming operation on the silver-chloride film (for example, if a shutter speed is too high, data fetch by image sensor 20 is fast, or if an aperture is too small, image focused on sensor 20 is unclear). Therefore, an image to be formed on the film can be confirmed. Note that in the above embodiment, a semiconductor memory is used as a recording medium of the electronic still camera, but can be a floppy disk.

A seventh embodiment of the present invention will now be described with reference to FIGS. 17 to 22, in which the date and other data is formed on a solid-state imaging element in addition to an object image.

Figure 17:
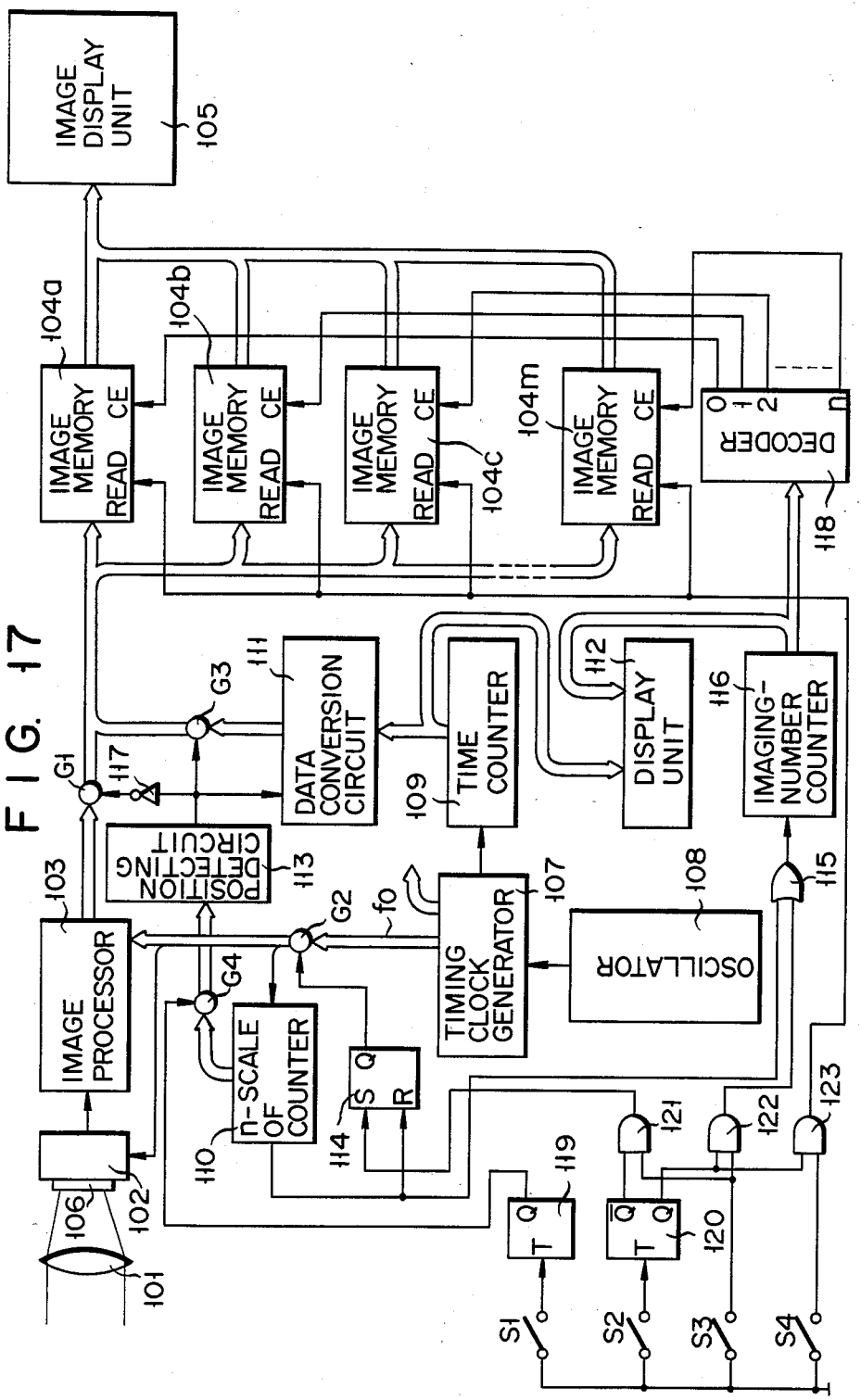
FIG. 17 is a block diagram of still another embodiment of the present invention.

FIG. 17 shows a circuit configuration of an electronic still camera to which the present invention is applied. An object image from imaging lens 101 is received by image sensor 102, and the object image of one frame is converted into image data by image processor 103. The image data of one frame is read out from processor 103, and is supplied to a plurality (13, in this embodiment) of image memories 104a to 104m through gate circuit G1, to be written in the specified memory. The image data of one frame written in memories 104a to 104m is supplied to imaging display unit 105 to be displayed thereon. Image sensor 102 comprises solid-state imaging elements (e.g., CCDs in this embodiment), and a number of CCDs are arranged in a matrix to increase the total number of pixels, thus improving resolution. One frame of an object image is focused on image sensor 102, which detects a density distribution of the image and converts it into an electrical signal. In order to pick up a signal from image sensor 102, either a frame-transfer type or interline type sensor can be adopted as the CCD sensor. Color filter (so-called mosaic filter in which three-primary color segments are dispersed) 106 is arranged in front of image sensor 102. Processor 103 receives various timing signals f0 generated from timing clock generator 107 for image processing through gate circuit G2. Generator 107 supplies various timing signals to various other circuit components in accordance with a reference clock signal from oscillator 108. For example, generator 107 supplies a timing clock to time counter 109, and supplies, to image sensor 102 and n-scale counter 110 through gate circuit G2, a clock synchronous with a read clock supplied to processor 103. Counter 109 counts the timing clocks from generator 107 to obtain time (hour and minute) data and date (year and month) data. The time-count data from counter 109 is supplied to data conversion circuit 111 to be converted into image data, and is then supplied to memories 104a to 104m through gate circuit G3, to be written in the specified memory. The time-count data obtained by counter 109 is displayed on additional data display unit 112.

N-scale counter 110 counts the clock signals from generator 107 to detect that image data of one frame is completely read out from processor 103. The count data from counter 110 is supplied to position detecting circuit 113 through gate circuit G4, and a carry signal generated in synchronism with completion of an image readout operation for one frame is supplied to an R-input terminal of SR flip-flop (T-FF) 114 to reset it. At the same time, the carry signal is counted by imaging-number counter 116 through OR gate 115. Position detecting circuit 113 detects an additional data start position of the time-count data. For example, if the time-count data is added at the lower side of a frame, circuit 113 detects additional data start position A in accordance with the count from counter 110. When circuit 113 detects the start position, it produces a "1" level signal directly to gate circuit G3 and to gate circuit G1 through inverter 117, thereby enabling circuits G1 and G3. The output from circuit 113 is also supplied to data conversion circuit 111 as an operation instruction signal.

Imaging-number counter 116 counts the imaging number, and the count therefrom is supplied to display unit 112 and is also supplied to and decoded by decoder 118. Decoder 118 decodes the content of counter 116 to produce decode outputs "0" and "1" to "n" corresponding thereto. The decoded output is supplied to CE (Chip Enable) terminals of memories 104a to 104m to specify them.

Each of image memories 104a to 104m comprises a RAM (Random-Access Memory), which can store image data of one frame, and read/write operation thereof is executed upon a switching operation (to be described later). Display unit 105 comprises a liquid-crystal display device, driven by a 120×160 dot-matrix display method. Unit 105 serves to provide an image reproduction function of the electronic still camera, and can display an image of one frame thereon. Unit 112 also comprises a liquid-crystal display device, but has a segment structure.

Switches S1 to S4 are arranged on the electronic still camera. Switch S1 is an ON switch for specifying whether or not the time-count data is added to a portion of an image; S2, a mode switch for switching between imaging and reproduction modes; S3, a shutter switch in the imaging mode and an image feed switch in the reproduction mode; and S4, an image display switch. A depression signal of switch S1 is supplied to a T-input terminal of T-FF 119 to invert the output therefrom. The $\overline{Q}$ output from T-FF 119 enables gate circuit G4. A depression signal of switch S2 is supplied to a T-input terminal of T-FF 120 to invert the output therefrom. T-FF 120 constitutes a mode switching circuit, and the $\overline{Q}$ output therefrom enables AND gate 121 and a Q output therefrom enables AND gates 122 and 123. A depression signal of switch S3 is supplied to an S-input terminal of T-FF 114 through AND gate 121 to set it. T-FF 114 is maintained in a set state until the image data of one frame is completely fetched. The Q output from T-FF 114 enables gate circuit G2. The depression signal of switch S3 is counted by counter 116 through AND gate 122 and OR gate 115. A depression signal of switch S4 is supplied to Read-input terminals of memories 104a to 104m through AND gate 123, to execute a read operation.

Figure 18:
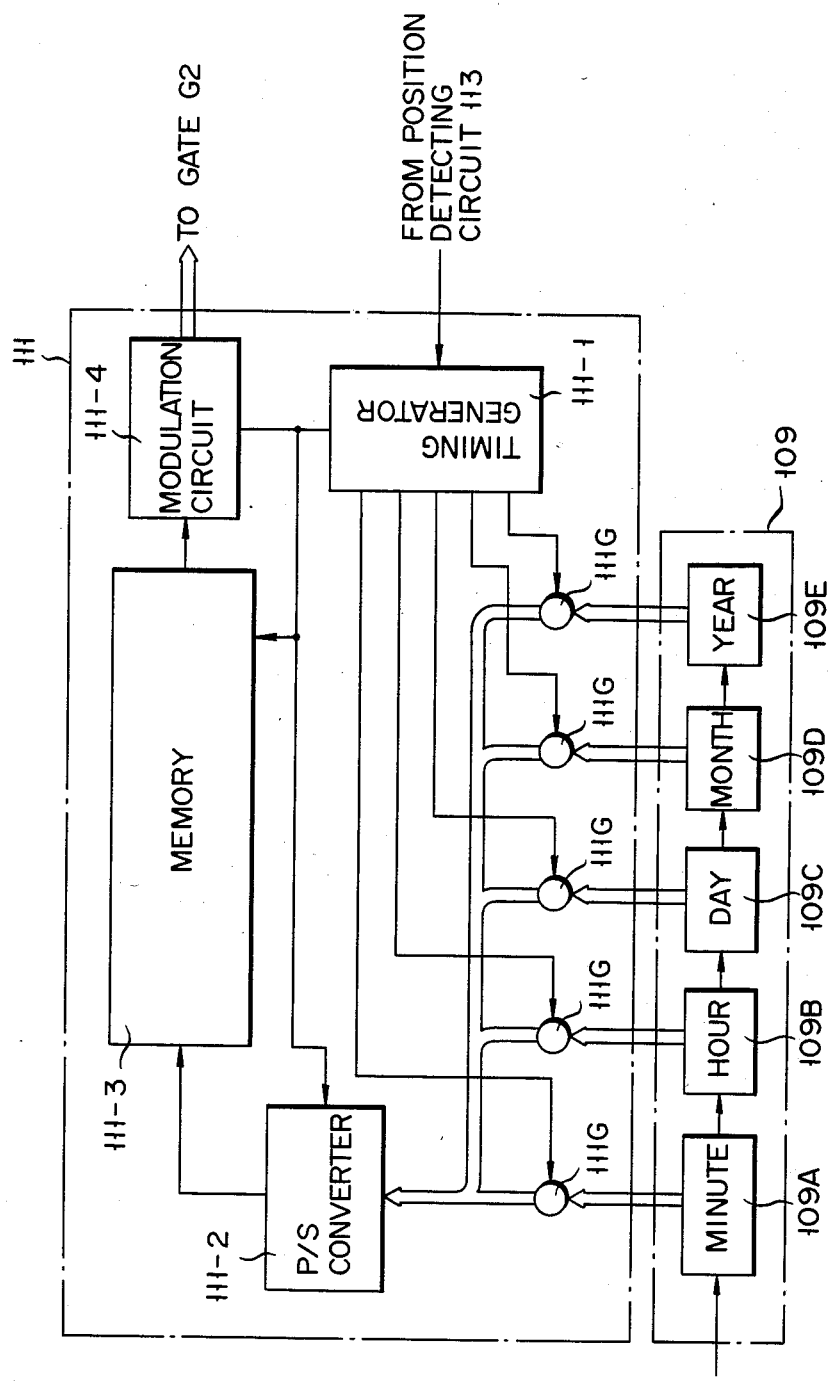
FIG. 18 is a detailed circuit diagram of a time keeping circuit and a data conversion circuit shown in FIG. 17.
Figure 20:
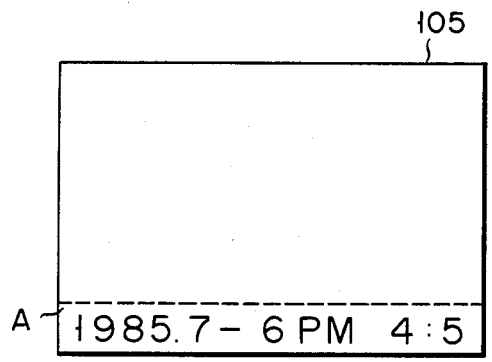
FIG. 20 is an illustration showing a display state of an imaging display unit of FIG. 17.

Time counter 109 and data conversion circuit 111 will be described in more detail with reference to FIG. 18. Counter 109 consists of minute, hour, day, mouth, and year counters 109A to 109E which are cascade-connected, and outputs from counters 109A to 109E are sequentially supplied to P/S (Parallel/Serial) converter 111-2 through respective gate circuits 111GA to 111GE. Gate circuits 111GA to 111GE are sequentially enabled in response to timing signals from timing generator 111-1, which is operated by the output from position detecting circuit 113, and supply the contents from 109A to 109E to P/S converter 111-2. Serial data generated from converter 111-2 is stored in memory 111-3 in a pattern of "1" and "0". FIG. 19 shows the content of memory 111-3. Numeral and character data represented by "0" and "1" patterns correspond to image data. The content of memory 111-3 is sequentially read out to be output through modulator 111-4.

When an image is to be sensed, the output state of T-FF 120 is inverted upon operation of switch S2, to set the $\overline{Q}$ output at "1", thereby switching to the imaging mode. When imaging lens 101 is directed toward an object in the imaging mode, an object image is focused on a finder (not shown). An operator checks the image and if he is satisfied, depresses switch S2. Since switch S2 serves as a shutter switch, the depression signal thereof is supplied to T-FF 114 to set it, thus enabling gate circuit G2. Next, the timing signal is supplied from generator 107 to image sensor 102, image processor 103, and n-scale counter 110. As a result, data of one frame, corresponding to an object image formed on image sensor 102, is converted into image data by processor 103 and is output therefrom. In this case, since the output from detecting circuit 113 is at "0" and the output from inverter 117 is at "1", gate circuit G1 is enabled and image data of one frame read out from processor 103 is written in the specified one of memories 104a to 104m. Since the content of counter 116 is set initially at "0", decoder 118 outputs a "0" signal that is supplied to the CE-input terminal of memory 104a. Thus, the first image data is written in memory 104a. During the data write operation, when start position A (FIG. 20) of additional data is reached, it is detected by circuit 113 and the output therefrom goes to "1" level. As a result, since gate circuit G1 is disabled, data supply to memory 104a from processor 103 is inhibited, gate circuit G3 is enabled, and data conversion circuit 111 is operated. Thus, the time-count data obtained by time counter 109 is converted into image data by data conversion circuit 111, and is written in memory 104a. More specifically, in circuit 111, when the output from circuit 113 goes to "1" level, an operation of generator 111-1 is started, gate circuits 111GA to 111GE are sequentially opened, and the contents of counters 109A to 109E constituting counter 109 are supplied to P/S converter 111-2, so that parallel data is converted into serial data to be written in memory 111-3, as shown in FIG. 19. The data written in memory 111-3 is then modulated by modulator 111-4. In this case, 1 pixel is too small to correspond with 1-bit data. Therefore, 1-bit data is modulated to correspond with 100 pixels. Thus, the modulated image data is written in a predetermined area of memory 104a. However, the write operation of this data is performed only in an additional-data write enable mode, i.e., when T-FF 119 is reset upon depression of switch S1, gate circuit G4 is enabled by the $\overline{Q}$ output from T-FF 119, and the count data from counter 110 is supplied to circuit 113. Therefore, if the write enable mode is not set, all the image data from processor 103 is written in memory 104a, and no time-count data is written.

When image data of one frame is stored in memory 104a, the carry signal is generated from n-scale counter 110 to reset T-FF 114. As a result, image processing is interrupted, the content of counter 116 is incremented by +1 (i.e., "1"), and decoder 118 produces a "1" signal, thereby specifying memory 104b.

When switch (shutter) S2 is depressed in this state, an image and additional data are stored in memory 104b. The imaging operation can be performed with respect to all the memories in this manner.

Figure 21:
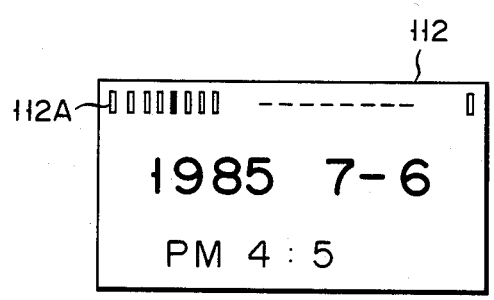
FIG. 21 is an illustration showing another display state of the imaging display unit of FIG. 17.

If image data stored in memories 104a to 104m is to be checked, switch S2 is depressed once to invert the Q output from T-FF 120 at "1", thereby setting the reproduction mode. In the reproduction mode, when switch S3 is depressed, since it serves as an image feed switch, the depression signal thereof is supplied and counted by counter 116 through AND gate 122 and OR gate 115. Note that a value corresponding to the number of depressions of switch S3 is set in counter 116. In this case, since the content of counter 116 is displayed on display section 112A of data display unit 112, as shown in FIG. 21, a desired value (number) can be set in counter 116 while visually observing section 112A. Note that the content of counter 109 is normally displayed on unit 112. When switch S4 is depressed in this state, the depression signal thereof is output from AND gate 123 to memories 104a to 104m as a read command. Therefore, the content of one of memories 104a to 104m, to which decoder 118 supplies a signal corresponding to the content of counter 116, is read out and is displayed on display unit 105.

In this embodiment, since time-count data can be stored in memories 104a to 104m, an additional-data memory can be omitted, unlike a conventional camera.

Figure 22:
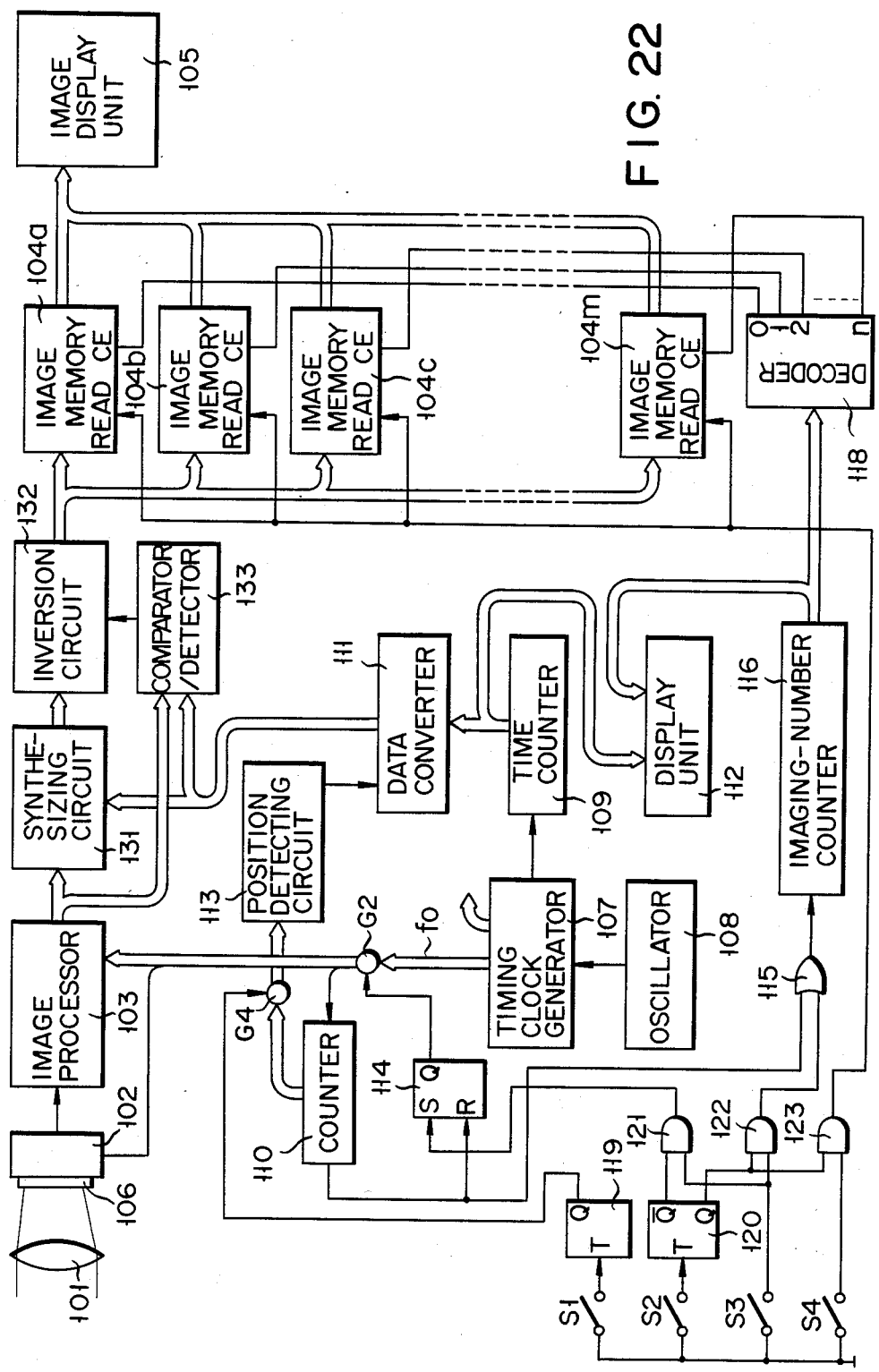
FIG. 22 is a block diagram of still another embodiment of the present invention.

An eighth embodiment different from that in FIG. 17 will now be described with reference to FIG. 22. The same reference numerals in FIG. 22 denote the same parts as in FIG. 17, and a detailed description thereof will be omitted. In the embodiment shown in FIG. 17, when time-count data is stored in an image memory, data from image processor 103 is interrupted. In this embodiment, however, image data from processor 103 and additional data from data conversion circuit 111 are synthesized without interrupting the data output from processor 103. More specifically, during the write operation of image data, when an additional-data start position is detected by position detecting circuit 113, additional image data is generated from data conversion circuit 111 and is supplied to synthesizing circuit 131 together with the image data from processor 103. Circuit 131 normally generates the data from processor 103. However, when the data is supplied to circuit 131 from circuit 111, circuit 131 synthesizes both the data and supplies it to inversion circuit 132. Both the data from processor 103 and circuit 111 are also supplied to comparator/detector 133 to be compared with each other. Comparator/detector 133 causes inversion circuit 132 to invert data from circuit 111 if both the data coincide with or are approximate to each other. More specifically, when data from processor 103 coincides with or is approximate to that from circuit 111, additional data from circuit 111 is inverted and, for example, complementary number data is produced. That is, if the data is "1101", data "0010" is generated. Thereby, if additional data is formed on an image from processor 103, it can be emphasized.

FIG. 23 shows an embodiment of the present invention that is different from the above embodiments. In this embodiment, arbitrary additional data (e.g., imaging location or imaging conditions) is input using alphabet keys of keyboard 141 to be written in memory 142, and is then converted into pattern data by character generator 143 and supplied to image memory 144. This allows writing of an arbitrary message. In this case, a data input means is not limited to a keyboard, but can be an input device which recognizes a manually input character pattern.

FIG. 24 shows a ninth embodiment of the present invention. In this embodiment, additional data is input by a voice recognition means. A voice input through microphone 151 is supplied to A/D (analog/digital) converter 154 through filter 152 and amplifier 153, and voice data from converter 154 is supplied to and recognized by voice recognition circuit 155, and is then written in image memory 156. Thus, arbitrary additional data can be input easily.

Note that the present invention is not limited to the above embodiments, and various changes and modifications may be made within the spirit and scope of the invention. For example, in the seventh embodiment, additional data is converted into image data. However, additional data can be stored directly in a memory and can be converted into image data in a reproduction (or display or print) mode to be displayed or printed.

In the seventh embodiment, an image sensor as a solid-state imaging element is a CCD type, but can be a MOS type or a CPD type as a combination of CCD and MOS types. An image memory comprises a RAM but can be a floppy disk.

What is claimed is:

1. An electronic still camera, comprising:
   optical lens system means including a lens and a diaphragm;
   solid-state imaging element means on which an object image incident through said optical lens system means is focused;
   image signal storage means having a plurality of memory areas, and coupled to said solid-state imaging element means, for storing in each of said memory areas an image signal corresponding to the object image focused on said solid-state imaging element means;
   means for receiving photosensitive film means arranged at a position different from said solid-state imaging element means and on which the object image incident through said optical lens system means is focused;
   shutter means arranged in front of said photosensitive film means, and normally closed for preventing the object image incident through said optical lens system means from reaching said photosensitive film means;
   switch means;
   control means coupled to said switch means, said control means including means for outputting first, second and third control signals when said switch means is operated;
   storage control means for controlling the storing of a still image signal, said storage control means including means responsive to said first control signal for causing said image signal storage means to sequentially store in different memory areas still image signals which correspond to respective object image which are incident through said optical lens system means and which are focused on said solid-state imaging element means;
   shutter drive means responsive to said second control signal for opening said shutter means so that a still image of the object image, which is incident through said optical lens system means, is formed on photosensitive film means in said receiving means; and
   optical system control means responsive to said third control signal for controlling the amounts of light representing an object image which pass through said diaphragm of said control lens system means during the operation of said storage control means and during the operation of said shutter drive means, so that the amount of light representing the object image at the position of said solid-state imaging element means during operation of said storage control means, is substantially equal to the amount of light representing the object image at the position of said receiving means during operation of said shutter drive means.

2. The camera of claim 1, further comprising a reflection mirror arranged in the optical path of said optical lens system for selectively causing the object image to be incident on said solid-state imaging element means or on said photosensitive film means.

3. The camera of claim 1, wherein said solid-state imaging element means is arranged on a reflection optical path formed by said reflection mirror.

4. The camera of claim 1, wherein said control means outputs said first and second control signals at different times.

5. The camera of claim 1, wherein:
   said switch means comprises a self-return type pushbutton switch; and
   said control means outputs said first and second control signals upon a single depression of said pushbutton switch.

6. The camera of claim 1, wherein said storage means comprises a magnetic floppy disk.

7. The camera of claim 1, wherein said storage means comprises a RAM.

8. The camera of claim 1, further comprising read control means for reading the still image signals stored in said image signal storage means for display.

9. The camera of claim 8, wherein said read control means comprises:
   key switch means for reading out from said storage means an image signal of a still image stored therein; and
   display means for displaying the image signal read out by said key switch means.

10. The camera of claim 9, wherein said display means is a liquid-crystal display device.

11. The camera of claim 8, wherein said read control means comprises:
    number storage means for storing a storage number corresponding to the number of object images stored in said storage means; and
    display means for displaying a content of said number storage means.

12. The camera of claim 1, further comprising:
    date counting means for counting at least date data; and
    date storage control means for causing said storage means to store date data provided by said date counting means.

13. The camera of claim 1, further comprising:
    key-operation input means for inputting character and numeral data; and
    numeral storage control means for causing said storage means to store one of character and numeral data input from said key-operation input means.

14. The camera of claim 1, further comprising:
    voice input means for inputting an external voice; and
    voice storage control means including means for converting the voice input by said voice input means into voice data, and means for causing said storage means to store the voice data.

* * * * *